(12) United States Patent  
Thyroff et al.

(10) Patent No.: US 8,459,286 B2  
(45) Date of Patent: Jun. 11, 2013

(54) PRESSURE RETENTION VALVE AND INTEGRATED VALVE FOR TANK SYSTEM

(75) Inventors: Jurgen Thyroff, Harxheim (DE); Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 330 days.

(21) Appl. No.: 12/975,510

(22) Filed: Dec. 22, 2010

(65) Prior Publication Data

US 2012/0160335 A1 Jun. 28, 2012

(51) Int. Cl.  
*F17D 1/16* (2006.01)

(52) U.S. Cl.  
USPC .... 137/14; 137/493.3; 137/493.6; 137/493.9; 137/512.2; 137/512.3

(58) Field of Classification Search  
USPC ............. 137/14, 493.3, 493.6, 493.9, 505.12, 137/505.13, 512.2, 512.3; 251/30.04  
See application file for complete search history.

(56) References Cited

U.S. PATENT DOCUMENTS

| | | | | |
|---|---|---|---|---|
| 2,676,612 A | * | 4/1954 | Stevenson | 137/489.3 |
| 2,761,470 A | * | 9/1956 | Batts | 137/625.6 |
| 3,547,498 A | * | 12/1970 | Bueler | 303/9.72 |
| 4,476,890 A | * | 10/1984 | Kawasaki et al. | 137/269 |
| 5,127,313 A | * | 7/1992 | Yonezawa | 91/447 |
| 5,950,669 A | * | 9/1999 | Fehlmann et al. | 137/493.3 |
| 7,367,349 B2 | * | 5/2008 | Thyroff | 137/14 |

* cited by examiner

*Primary Examiner* — Eric Keasel  
*Assistant Examiner* — Jessica Cahill  
(74) *Attorney, Agent, or Firm* — Dinsmore & Shohl LLP

(57) ABSTRACT

A pressure retention valve with integrated valve is disclosed. The pressure retention valve with integrated valve includes a housing; an outer piston positioned in the housing; a main seal between the outer piston and the housing; an inner piston positioned in the outer piston, the inner piston having a bore containing a valve; a spring between the housing and a top of the outer piston; an ambient bore in the housing above the main seal; an outlet in the housing below the main seal; and a vessel connection in the housing adjacent to the bore of the inner piston. Methods of supplying fuel to a gas consuming system using the pressure retention valve are also described.

19 Claims, 4 Drawing Sheets

PRESSURE RETENTION VALVE AND INTEGRATED VALVE FOR TANK SYSTEM

BACKGROUND OF THE INVENTION

This invention relates generally to a high pressure tank system, and more particularly to a high pressure tank system with a pressure retention valve with an integrated valve.

The tank vessel is a key component in a high pressure storage system. High pressure storage systems are used in a wide variety of applications including vehicle applications, such as vehicles run by hydrogen, or compressed natural gas (CNG). It is desirable to use fiber composite vessels (known as "type 4" vessels) for the tank because they have a good storage to weight ratio. Type 4 vessels have two layers: an outer layer, made of a carbon fiber matrix for example, designed to bear the mechanical load; and an inner layer, or liner, made of a bubble of plastic or aluminum, designed to prevent leaking.

To ensure that the liner is firmly supported by the outer layer, a minimum pressure should be maintained in the tank at all times. If pressurizing is started from an initial pressure below the minimum pressure, the liner might rupture, and the contents would flow through the outer layer into the environment.

Conventional gas tank systems use an electrical pressure sensor signal to maintain the minimum pressure. The signal is evaluated in a vehicle controller. If the minimum pressure is reached, the tank valve(s) are closed. This system is an active system, requiring a controller, pressure sensor, algorithm, and electrical power to control the minimum pressure. The residual non-usable gas amount depends on the accuracy of the pressure sensor. However, the pressure sensors have a tolerance limitation which has to be considered, and they do not have good accuracy at low pressure. In addition, drift of the sensor signal can occur over time. Due to the high deviation in the low pressure range, a significant pressure safety margin has to be added to the nominal minimum operation pressure. This leads to a reduction in the amount of usable hydrogen/gas mass, and thus to a lower range for the vehicle.

SUMMARY OF THE INVENTION

One aspect of the invention is a pressure retention valve with integrated valve. In one embodiment, the pressure retention valve with integrated valve includes a housing; an outer piston positioned in the housing; a main seal between the outer piston and the housing; an inner piston positioned in the outer piston, the inner piston having a bore containing a valve; a spring between the housing and a top of the outer piston; an ambient bore in the housing above the main seal; an outlet in the housing below the main seal; and a vessel connection in the housing adjacent to the bore of the inner piston.

Another aspect of the invention is a method of supplying fuel to a gas consuming system. In one embodiment, the method includes providing a tank vessel, the gas consuming system connected to the tank vessel by a pipe, a refueling line connected to the pipe between the tank vessel and the gas consuming system, and a pressure retention valve with integrated valve connected to the pipe between the tank vessel and the refueling line connection, the pressure retention valve comprising: a housing; an outer piston positioned in the housing; a main seal between the outer piston and the housing; an inner piston positioned in the outer piston, the inner piston having a bore containing a valve; a spring between the housing and a top of the outer piston; an ambient bore in the housing above the main seal; an outlet in the housing below the main seal; and a vessel connection in the housing adjacent to the bore of the inner piston; selecting a minimum operating pressure for the tank vessel; when a tank vessel pressure is greater than the minimum pressure, the tank vessel pressure lifting the inner piston from a bottom of the housing and opening a path from the vessel connection to the outlet, a top of the inner piston remaining in contact with the outer piston and lifting the outer piston, and supplying fuel to the gas consuming system; and when the tank vessel pressure is less than the minimum pressure, the tank vessel pressure being insufficient to lift the inner piston from the bottom of the housing or being insufficient to maintain the inner piston in the lifted position, closing the path from the vessel connection to the outlet, the top of the inner piston remaining in contact with the outer piston, and ending the supply of fuel to the gas consuming system.

BRIEF DESCRIPTION OF THE INVENTION

DETAILED DESCRIPTION OF THE INVENTION

The present invention optimizes the operating range of a high pressure gas tank with a minimum operation pressure. The gas tank system includes a pressure retention valve with an integrated valve. The valve operates as a self-contained tank vessel shut-off valve when the minimum pressure is reached, and it provides valve functionality to permit fueling of the tank.

This allows the minimum vessel pressure to be controlled mechanically. It reduces the minimum pressure tolerance compared to a conventional electrical pressure measurement and shut-off system. This results in a lower pressure safety margin to minimum allowed vessel pressure, and consequently either a higher range or a smaller tank system with equal range.

The pressure retention valve with the integrated valve reduces the complexity of controlling the minimum pressure in the vessel because pressure sensors and related connectors, wiring, controller, and software are not needed. There are no solenoids or other electrical components near the vessel or the fueling line. The minimum vessel pressure can be maintained even when the electrical system is inoperable or disconnected. There are no electromagnetic compatibility problems. It reduces costs and requires less service because there is no need to compensate for pressure sensor drift. It is more reliable and safer than the prior art control.

The combination of the pressure retention valve and the valve in one housing reduces the number of parts and the number of piping connections and sealings to ambient. The advanced sealing construction, which involves sealings without relative movement, results in a highly reliable valve with reduced service operation, and very low friction.

Figure 1:
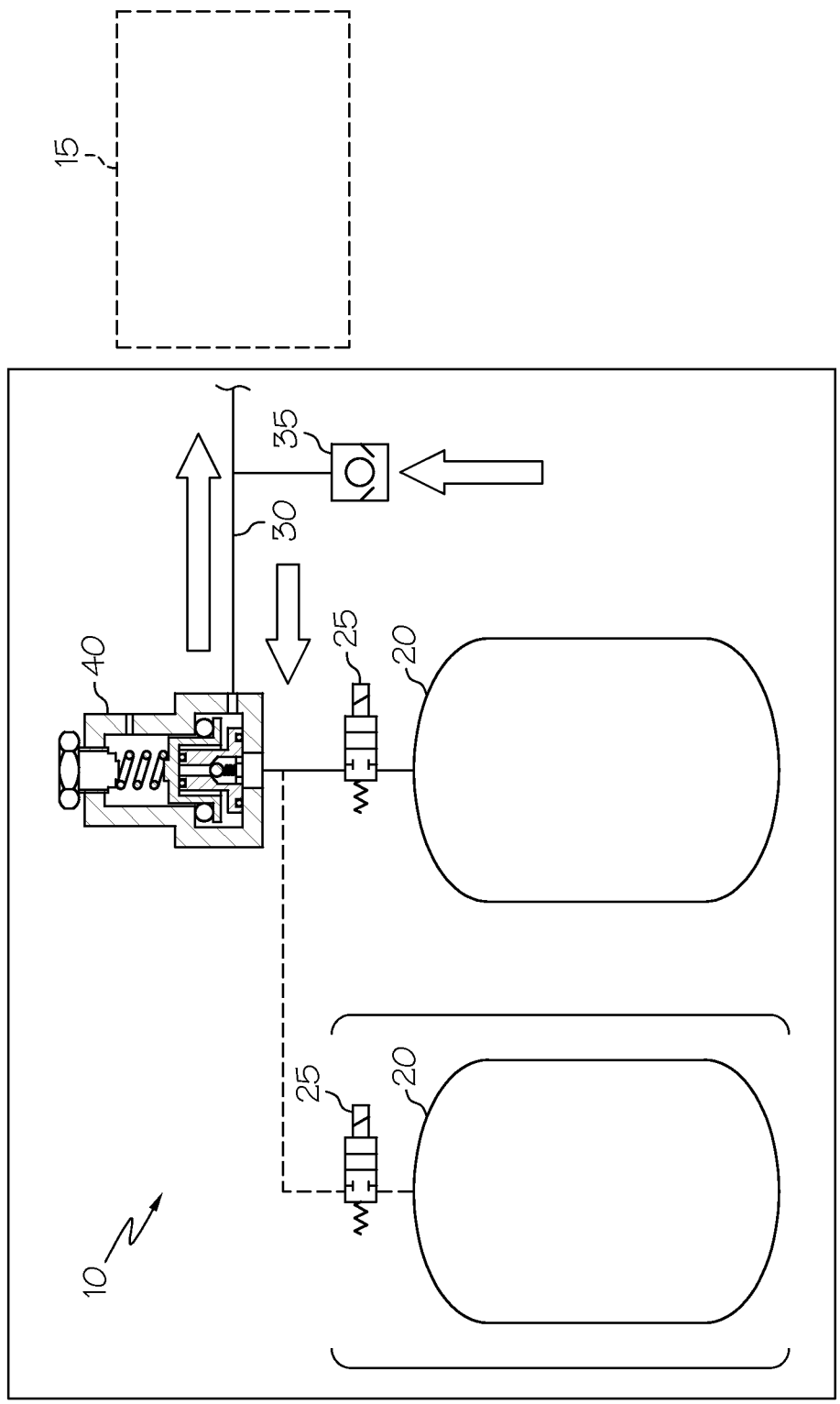
FIG. 1 is an illustration of one embodiment of a tank system with the pressure retention valve with an integrated check valve.

FIG. 1 shows a feed system 10 for gas consuming system 15, such as a fuel cell. The feed system includes one or more tank vessels 20. Each tank vessel has a shutoff valve 25. The tank vessel(s) 20 are connected to the fuel cell 15 by a pipe 30. During normal operation the feed flow is from the tank vessel(s) 20 to the fuel cell 15. There is a check valve 35 connected to the pipe 30 to allow refueling of the tank vessel(s) 20. During fueling, the flow is from the check valve 35 to the tank vessel(s) 20. There is also a pressure retention valve with an integrated valve 40 between the tank vessel(s) 20 and the fuel cell 15.

Figure 2:
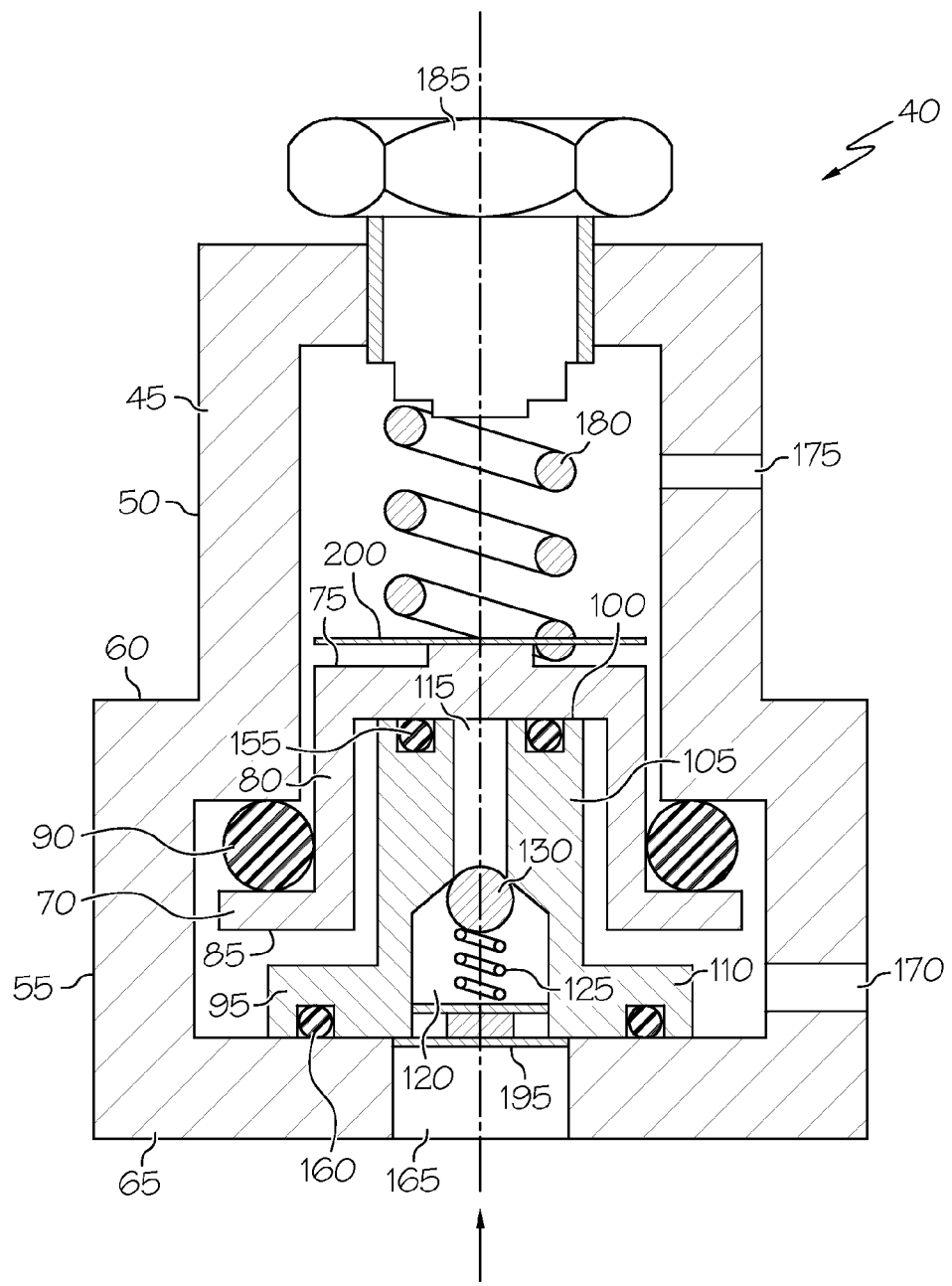
FIG. 2 is an illustration of one embodiment of a pressure retention valve with an integrated check valve and its operation when the minimum pressure is reached.
Figure 3:
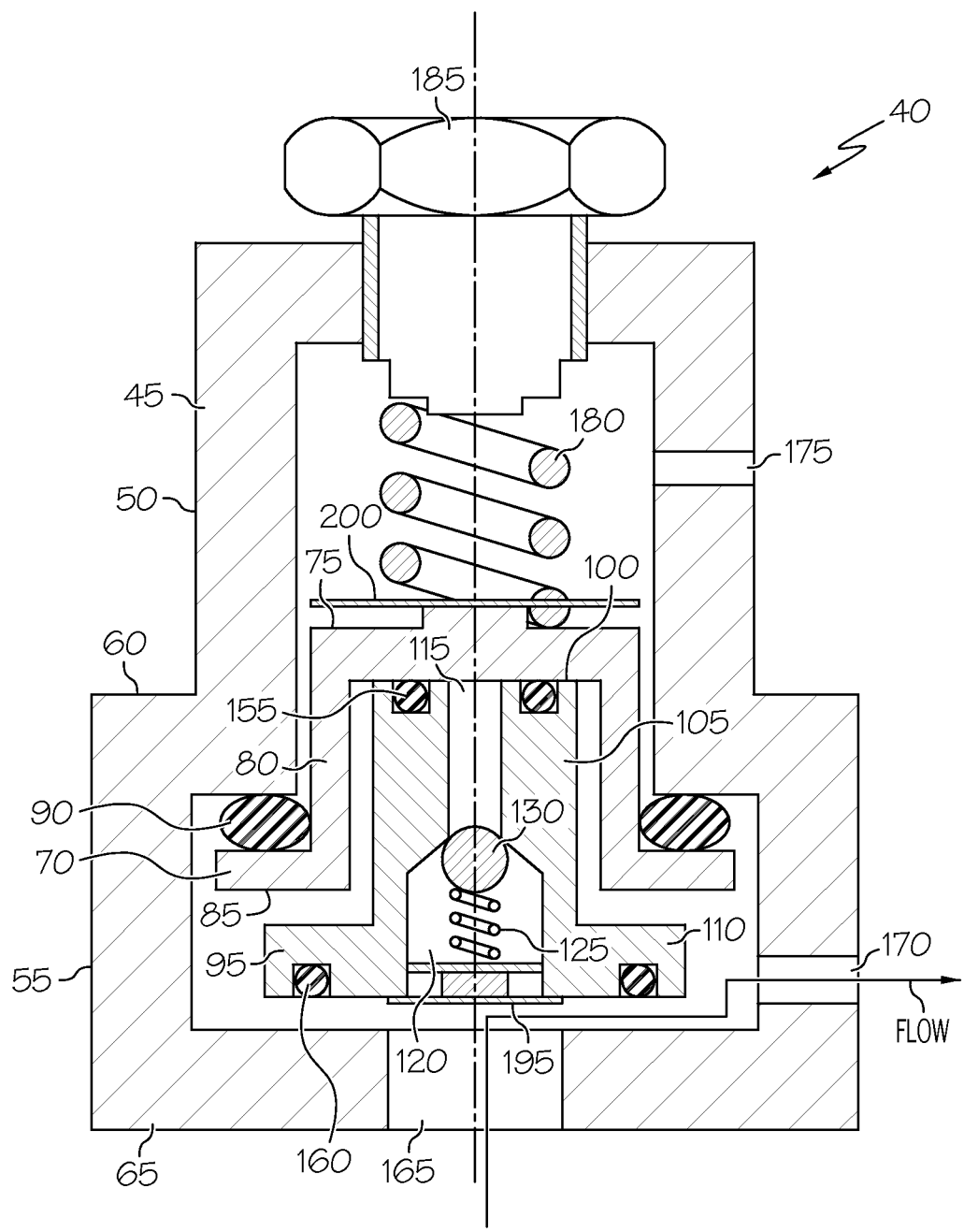
FIG. 3 is an illustration of the normal operation of the pressure retention valve with the integrated check valve shown in FIG. 2.
Figure 4:
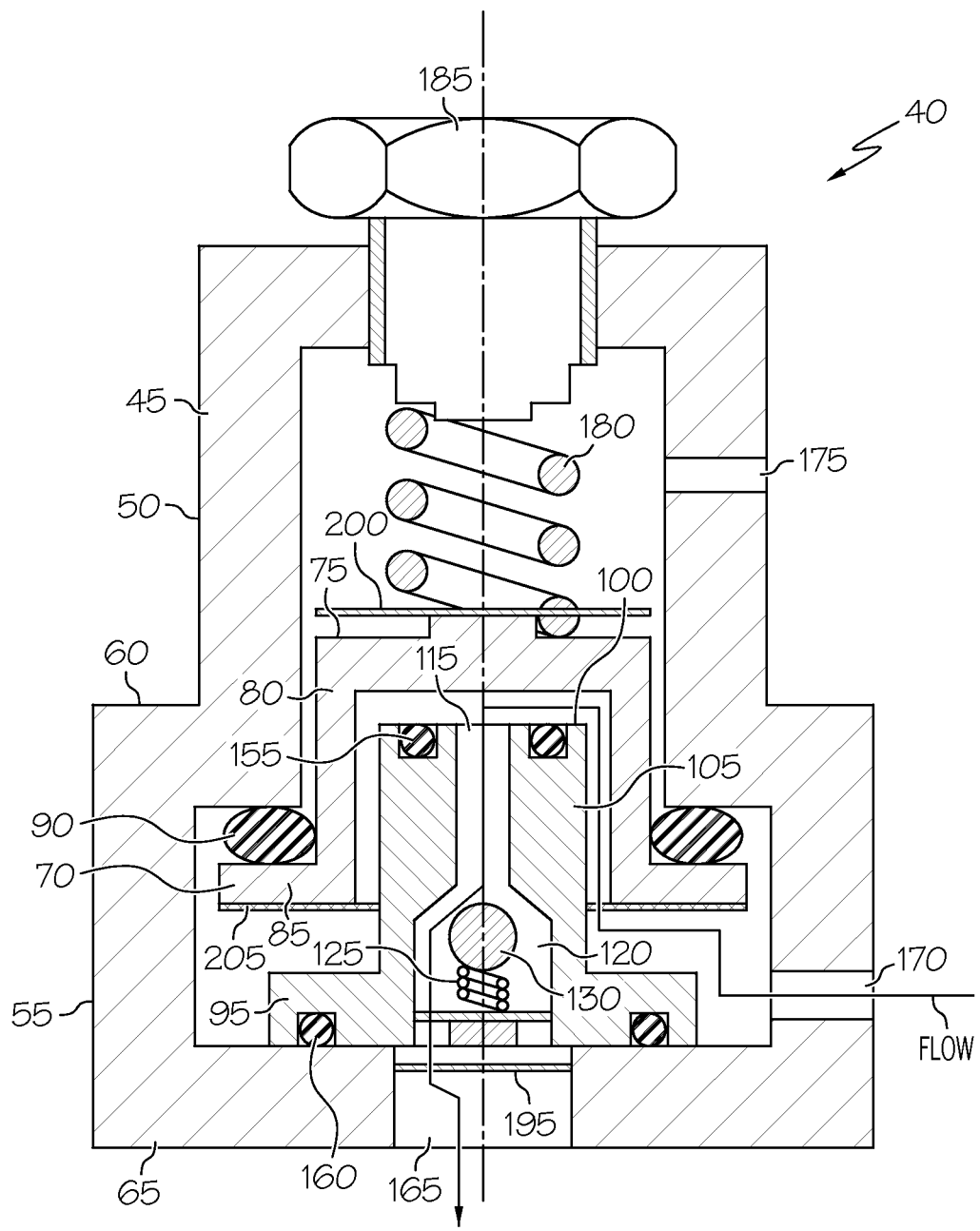
FIG. 4 is an illustration of the operation of the pressure retention valve with an integrated check valve shown in FIG. 2 during fueling.

The pressure retention valve 40 is shown in more detail in FIGS. 2-4. The pressure retention valve 40 includes a housing 45. The housing 45 has a narrower upper portion 50 and a wider lower portion 55 with a shoulder 60 between the upper portion 50 and the lower portion 55, and a bottom 65.

There is an outer piston 70 with a top 75, sides 80, and a flange 85 extending outward from the sides 80. Between the shoulder 60 of the housing 45 and the flange 85 of the outer piston 70, there is a main seal 90. The main seal 90 can be an o-ring, for example.

There is an inner piston 95 with a top 100, sides 105, and a flange 110 extending outward from the sides 105. The inner piston 95 has a upper bore 115 and a wider lower bore 120. The lower bore 120 contains a check valve spring 125 and check valve ball 130.

There is a seal 155 between the top 100 of the inner piston 95 and the underside of the top 75 of the outer piston 70. There is a seal 160 between the flange 110 of the inner piston 95 and the bottom 65 of the housing 45.

There is a vessel connection 165 in the bottom 65 of the housing 45 which connects the tank vessel(s) 20 to the pressure retention valve 40. The vessel connection 165 aligns with the lower bore 120 of the inner piston 95.

There is an outlet 170 in the side of the lower portion 55 of the housing 45. The pipe 30 connects the outlet 170 with the fuel cell 15 and the check valve 35 which allows refueling of the tank vessel(s).

There is an ambient bore 175 in the side of the upper portion 50 of the housing 45.

The main spring 180 in the upper portion 50 of the housing 45 exerts pressure on the upper side of the top 75 of the outer piston 70. The adjusting screw 185 is used to adjust the main spring 180.

FIG. 2 illustrates the operation of the pressure retention valve 40 when the minimum pressure condition is reached ($p_{tank} < p_{min}$). The tank pressure exerts pressure on the effective area 195. However, the resulting force is too low to lift the inner piston 95. The opposing closing force is the sum of the main spring 180, and ambient pressure pressing on the upper area 200. The main seal 90, and seals 155, 160 have enough pre-load to guarantee leak tightness. The adjusting screw 185 is used to change the pre-load of the main spring 180, which sets the desired closing pressure, $p_{min}$, of the outer piston 70. At normal operation, the force balance between the outer 70 and the inner piston 95, based on pressure and spring force, results in a direct contact between the two pistons. Therefore, there is no disconnection between the inner piston 95 and the outer piston 70, and the refueling path is closed by seal 155.

FIG. 3 illustrates the operation of the pressure retention valve 40 in normal operation, i.e., when the tank vessel pressure is greater than the minimum operating pressure ($p_{tank} > p_{min}$). In normal operation, the tank delivers hydrogen to the fuel cell. The tank pressure exerts pressure on the effective area 195, resulting in a force lifting the inner piston 95. The top 100 of inner piston 95 is in contact with the underside of the top 75 of the outer piston 70. The opposing closing force is the sum of the main spring 180, ambient pressure (the pressure through ambient bore 175) pressing on the upper area 200 of the outer piston 70 and the squeezing of main seal 90. When the tank pressure is high enough, the inner piston 95 lifts along with the outer piston 70, and hydrogen flows from the vessel connection 165 to the outlet 170.

FIG. 4 illustrates the operation of the pressure retention valve 40 during refueling ($p_{anode} > p_{tank}$). The fueling pressure at the outlet (or anode) is higher than the tank pressure, and it is applied to effective area 205. Thus, the outer piston 70 moves upward and disconnects from the inner piston 95. Seal 155 does not provide a seal because of the space between the outer piston 70 and the inner piston 95, and the pressure difference over the check valve spring 125 and check valve ball 130 opens the refueling path. The refueling path remains open as long as the refuel pressure force on the effective area 205 is greater than the sum of the ambient pressure applying upper area 200, main spring 180, and main seal 90.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A pressure retention valve with integrated check valve comprising:
   a housing having an upper portion, a wider lower portion, and a shoulder between the upper portion and the lower portion;
   an outer piston positioned in the housing;
   a main seal between an outwardly extending flange on a bottom of the outer piston and the shoulder of the housing;
   an inner piston positioned in the outer piston, the inner piston having a bore containing a check valve;
   a seal between a top of the inner piston and an underside of a top of the outer piston;
   a seal between a bottom of the inner piston and a bottom of the housing;

a spring between the housing and a top of the outer piston;
an adjusting screw extending through the housing and contacting the spring;
an ambient bore in the upper portion of the housing above the main seal;
an outlet in the lower portion of the housing below the main seal; and
a vessel connection in the housing adjacent to the bore of the inner piston.

2. A method of supplying fuel to a gas consuming system comprising:
providing a tank vessel, the gas consuming system connected to the tank vessel by a pipe, a refueling line connected to the pipe between the tank vessel and the gas consuming system, and a pressure retention valve with integrated valve connected to the pipe between the tank vessel and the refueling line connection, the pressure retention valve comprising:
a housing;
an outer piston positioned in the housing;
a main seal between the outer piston and the housing;
an inner piston positioned in the outer piston, the inner piston having a bore containing a valve;
a spring between the housing and a top of the outer piston;
an ambient bore in the housing above the main seal;
an outlet in the housing below the main seal; and
a vessel connection in the housing adjacent to the bore of the inner piston;
selecting a minimum operating pressure for the tank vessel;
when a tank vessel pressure is greater than the minimum pressure, the tank vessel pressure lifting the inner piston from a bottom of the housing and opening a path from the vessel connection to the outlet, a top of the inner piston remaining in contact with the outer piston and lifting the outer piston, and supplying fuel to the gas consuming system; and
when the tank vessel pressure is less than the minimum pressure, the tank vessel pressure being insufficient to lift the inner piston from the bottom of the housing or being insufficient to maintain the inner piston in the lifted position, closing the path from the vessel connection to the outlet, the top of the inner piston remaining in contact with the outer piston, and ending the supply of fuel to the gas consuming system.

3. The method of claim 2 further comprising:
when the tank vessel pressure is less than the minimum pressure, connecting a refueling supply to the refueling line, an outlet pressure being greater than the tank vessel pressure, the outlet pressure lifting the outer piston from the top of the inner piston while the inner piston remains in a lowered position so that the path from the vessel connection to the outlet is closed, opening a refueling path from the outlet between the top of the inner piston and the outer piston and through the bore in the inner piston to the vessel connection, and refueling the tank vessel.

4. The method of claim 2 wherein the pressure retention valve further comprises an adjusting screw extending through the housing and contacting the spring, further comprising adjusting the adjusting screw.

5. The method of claim 2 wherein the minimum pressure is a sum of a force of the spring, ambient pressure, and a pressure of the main seal.

6. A pressure retention valve with integrated valve comprising:
a housing;
an outer piston positioned in the housing;
a main seal between the outer piston and the housing;
an inner piston positioned in the outer piston, the inner piston having a bore containing a check valve;
a spring between the housing and a top of the outer piston;
an ambient bore in the housing above the main seal;
an outlet in the housing below the main seal; and
a vessel connection in the housing adjacent to the bore of the inner piston.

7. The pressure retention valve of claim 6 wherein the main seal comprises an o-ring.

8. The pressure retention valve of claim 6 further comprising an adjusting screw extending through the housing and contacting the spring.

9. The pressure retention valve of claim 6 wherein the check valve comprises a spring and ball.

10. The pressure retention valve of claim 6 further comprising a seal between a top of the inner piston and an underside of a top of the outer piston.

11. The pressure retention valve of claim 10 wherein the seal between the top of the inner piston and the underside of the top of the outer piston comprises an o-ring.

12. The pressure retention valve of claim 10 wherein the seal is in the top of the inner piston.

13. The pressure retention valve of claim 6 further comprising a seal between a bottom of the inner piston and a bottom of the housing.

14. The pressure retention valve of claim 13 wherein the seal between the bottom of the inner piston and the bottom of the housing comprises an o-ring.

15. The pressure retention valve of claim 13 wherein the seal is in the bottom of the inner piston.

16. The pressure retention valve of claim 6 wherein the housing has an upper portion, a wider lower portion, and a shoulder between the upper portion and the lower portion.

17. The pressure retention valve of claim 16 wherein the main seal is between an outwardly extending flange on a bottom of the outer piston and the shoulder of the housing.

18. The pressure retention valve of claim 16 wherein the ambient bore is in the upper portion of the housing.

19. The pressure retention valve of claim 16 wherein the outlet is in the lower portion of the housing.

* * * * *